United States Patent [19]
Sogawa et al.

[11] Patent Number: 5,140,238
[45] Date of Patent: Aug. 18, 1992

[54] ROBOT CONTROL APPARATUS

[75] Inventors: Kenji Sogawa, Hirakata; Yoichi Sugitomo, Nishinomiya, both of Japan

[73] Assignee: Matsushita Electric Industrial Co., Ltd., Osaka, Japan

[21] Appl. No.: 671,926

[22] Filed: Mar. 20, 1991

[30] Foreign Application Priority Data

Mar. 20, 1990 [JP] Japan .................................. 2-70414

[51] Int. Cl.$^5$ ............................................. H03K 13/02
[52] U.S. Cl. ................................... 318/569; 318/661; 318/568.1; 318/616
[58] Field of Search ................... 318/560-646, 318/660, 661; 364/513; 901/3, 9, 12, 15-23; 324/160-177

[56] References Cited
U.S. PATENT DOCUMENTS

| | | | |
|---|---|---|---|
| 4,070,665 | 1/1978 | Glennon et al. | 318/569 X |
| 4,134,106 | 1/1979 | Hungerford | 318/569 X |
| 4,792,739 | 12/1988 | Nakamura et al. | 318/661 X |

Primary Examiner—Paul Ip
Attorney, Agent, or Firm—Wenderoth, Lind & Ponack

[57] ABSTRACT

A robot control apparatus includes a sine wave signal-outputting device, an operating device, a command device for outputting a current value, a substracting device, an electric power amplifying device, and a programmable filter. The outputting device outputs sine wave signals of first and second phases having a phase difference of approximate 90° generated by a position shift of a movable portion of a motor for driving an arm of a robot. The operating device determines the difference between a product of a value corresponding to the first phase signal and a value obtained by first-order differentiating a value corresponding to the second phase signal and a product of a value corresponding to the second phase signal and a value obtained by first-order differentiating the value corresponding to the first phase signal. The subtracting device subtracts the current value from the value outputted from the operating device based on the current value, and outputs a signal corresponding to a result the subtraction. The amplifying device outputs a signal to supply electric power to the motor in response to the signal outputted from the subtracting device. A filter operates as one of a high-pass and a band-pass filters according to the difference outputted from the command device, and is provided between the outputting device and the operating device and operates as a high-pass filter when the arm starts moving and the band-pass filter operates when the arm stops in contact with an object, and outputs a signal to the operating device.

4 Claims, 4 Drawing Sheets

ROBOT CONTROL APPARATUS

BACKGROUND OF THE INVENTION

The present invention relates to a robot control apparatus for controlling the movement of an arm of a direct drive robot.

A robot has been recently introduced into a production line for automated productions and a direct drive robot has been put in practical use with a demand for production at a high speed and with a high accuracy. A control function for controlling the moving speed of the direct drive robot has been developed and will put to practical use.

An example of a conventional method for controlling the arm of a robot is described with reference to FIG. 3 which shows a conventional current control loop of the robot. The robot control apparatus comprises a command section 1 for sequentially outputting a current value necessary for driving a motor to a subtracter 2; the subtracter 2; an electric power amplifier 3 for applying to the motor a voltage proportional to the current value instructed by the command section 1; a current detector 4 for detecting current flowing the motor 5; and the motor 5.

The operation of the apparatus of the above construction is described below. The command section 1 calculates a current value necessary for driving the motor 5, thus outputting the current value to the current control loop. The subtracter 2 subtracts the current value outputted from the current detector 4 from the current value outputted from the command section 1 so that both values are equal to each other, thus outputting a signal to the electric power amplifier 3 as a result of the subtraction. Thus, current flows through the motor 5 so that the current flowing the motor 5 is equal to the current value outputted from the command section 1.

According to the above construction, due to the static friction of the motor bearing, the motor shaft does not start rotating when the arm of the robot starts moving. Another issue is that an impulse force is generated when the arm of the robot arm contacts an object such as a workpiece.

In order to resolve the issue, there has been proposed an apparatus for controlling the movement of the arm of a robot based on the relationship between the frequencies of the arm and the object and the current. FIG. 4 is a graph showing the relationship between the frequencies and the current according to detected values and expected values in the conventional robot control apparatus. In FIG. 4, a curve X is drawn based on previously expected and calculated values, a curve Y is drawn based on detected values in the conventional apparatus, and a curve Z is drawn as a result of the addition of curves X and Y. The values of the curve X are previously calculated so that the calculated values of the curve X may be added to the detected values of the curve Y to form the curve Z. The curve Z shows the smooth movement of the arm. Then, in the conventional apparatus, the current flowing the motor is controlled so that both curves X and Y may be added to form the smooth curve Z for smoothly controlling the movement of the arm.

However, if a curve drawn based on actually detected values is greatly different from the curve Y, even though both the values of the actually detected curve and the curve X are added to each other, it is impossible to form the curve Z, thus preventing the smooth movement of the arm of the robot.

SUMMARY OF THE INVENTION

It is therefore an object of the present invention to provide a robot control apparatus for starting a motor shaft smoothly and reliably irrespective of the static friction of a motor bearing when the arm of a robot starts moving, and for allowing the generation of an impulse force to be reduced when the arm of the robot stops in contact with an object.

In accomplishing these and other objects, according to one aspect of the present invention, there is provided a robot control apparatus comprising:

a sine wave signal-outputting means for outputting signals of sine waves of a first phase and a second phase, in a cycle of a predetermined pitch, having a phase difference of approximate 90° generated by a position shift of a movable portion of a motor for driving an arm of a robot;

an operating means for performing an operation to find difference between a product of a value of a signal corresponding to the first phase and a value obtained by differentiating a value of a signal corresponding to the second phase by first-order and a product of the value of the signal corresponding to the second phase and a value obtained by differentiating the value of the signal corresponding to the first phase by first-order;

a command means for outputting a current value;

a subtracting means for subtracting the current value outputted from the command means from the value outputted from the operating means based on the current value outputted by the command means, and for outputting a signal as a result of the subtraction;

an electric power amplifying means for outputting a signal to the motor to supply electric power, for driving the motor in response to the signal outputted from the subtracting means; and a programmable filter for designating one band of a high-pass filter and a band-pass filter according to the value outputted from the command means, the filter being provided between the outputting means and the operating means so that the high-pass filter operates when the arm of the robot starts moving and the band-pass filter operates when the arm of the robot stops in contact with an object, and for outputting a signal to the operating means, the signal having inputted into the programmable means and passing therethrough.

According the above construction, the motor shaft can be smoothly and reliably started irrespective of the static friction of a motor bearing when the arm of the robot starts moving, and the generation of an impulse force is reduced when the arm of the robot stops in contact with the object.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
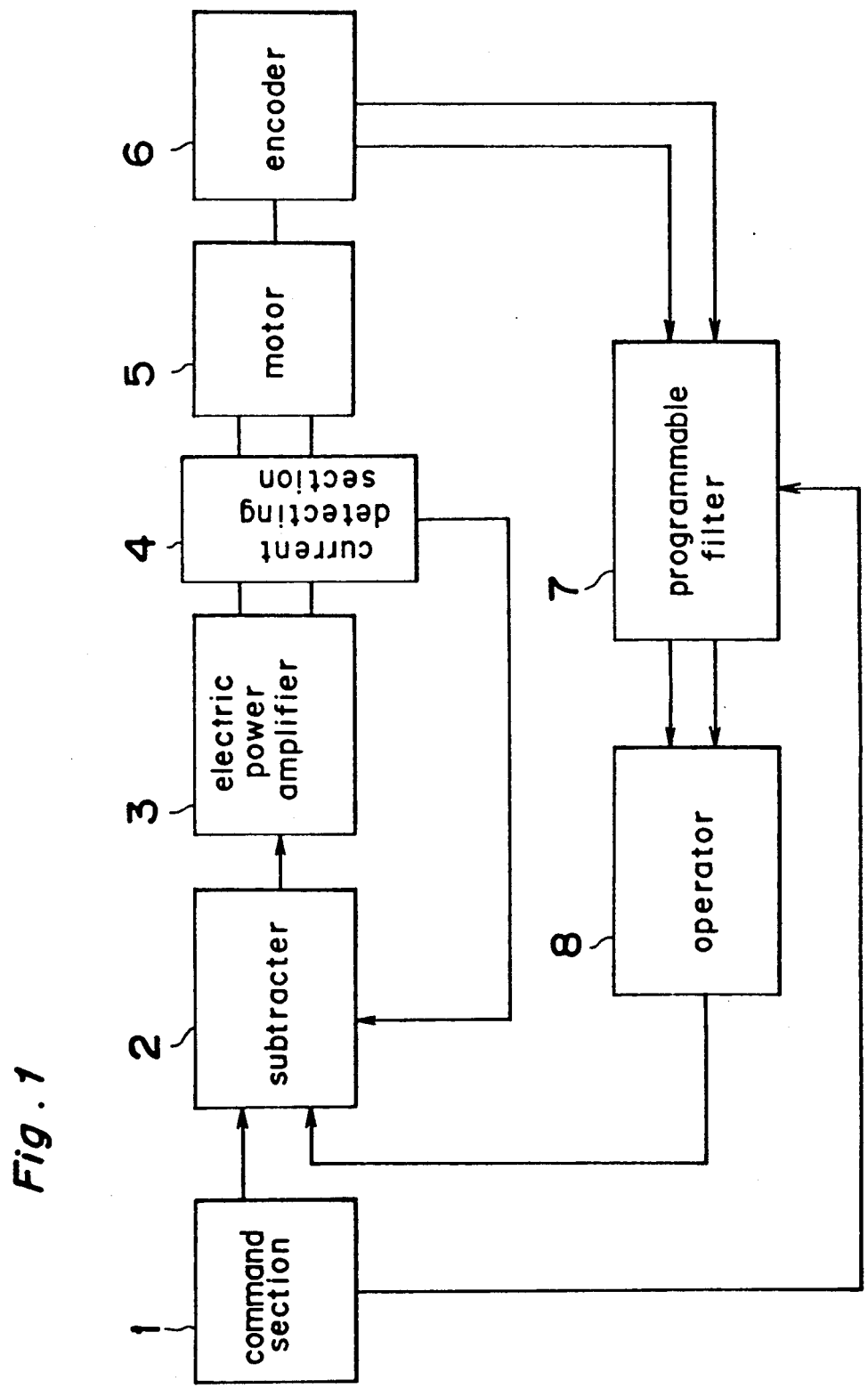
FIG. 1 is a block diagram showing a robot control apparatus according to an embodiment of the present invention.

Before the description of the present invention proceeds, it is to be noted that like parts are designated by like reference numerals throughout the accompanying drawings.

Referring to FIG. 1, a robot control apparatus according to a first embodiment of the present invention is described below. The apparatus comprises a command section 1 for sequentially outputting a current value necessary for generating electric power for driving a motor 5; a subtracter 2 for subtracting a current value from the output of an operator based on the current value outputted by the command section 1; an electric power amplifier 3 for applying a voltage proportional to the current value outputted by the command section 1 to the motor 5; the motor 5; a current detecting section 4 for detecting current flowing to the motor 5; an encoder 6 for outputting sine waves of a first phase and a second phase, of a predetermined frequency, having a phase difference of approximate 90° generated by the position shift of the movable portion of the motor 5. The current detecting section 4 detects a value of the current flowing to the motor 5 and thereafter outputs the detected current value to the subtracter 2, so that the subtracter 2 performs the subtraction while considering the detected current value detected by the current detecting section 4. The apparatus further comprises a programmable filter 7 for designating either the band of a high-pass filter or the band of a band-pass filter according to the current value outputted by the command section 1; an operator 8 for finding the acceleration of the arm of a robot by calculating the difference between the product of the value of a signal corresponding to the first phase and a value obtained by differentiating the value of a signal corresponding to the second phase by second-order and the product of the value of the signal corresponding to the second phase and a value obtained by differentiating the value of the signal corresponding to the first phase by second-order.

Figure 2:
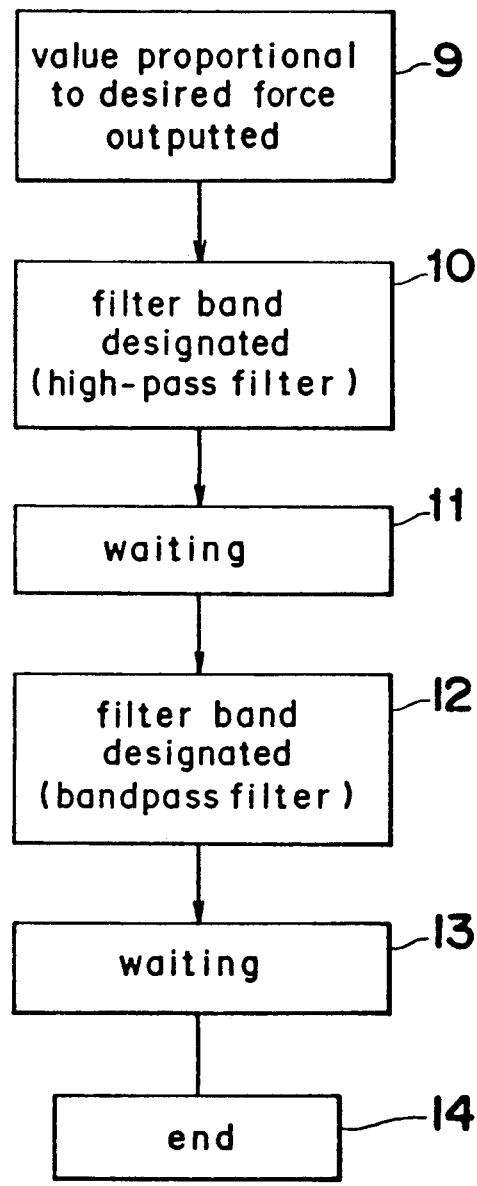
FIG. 2 is a flowchart showing the processing to be performed by a command section according to the embodiment of the present invention.
Figure 3:
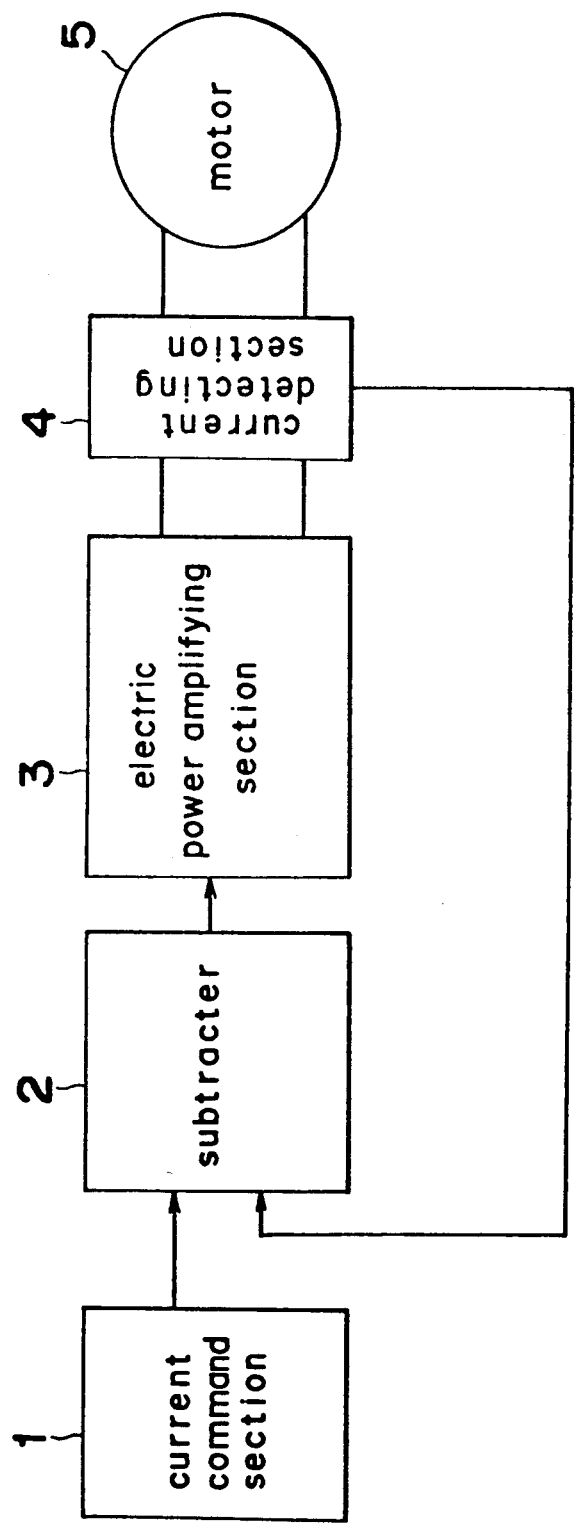
FIG. 3 is a block diagram showing a conventional robot control apparatus.
Figure 4:
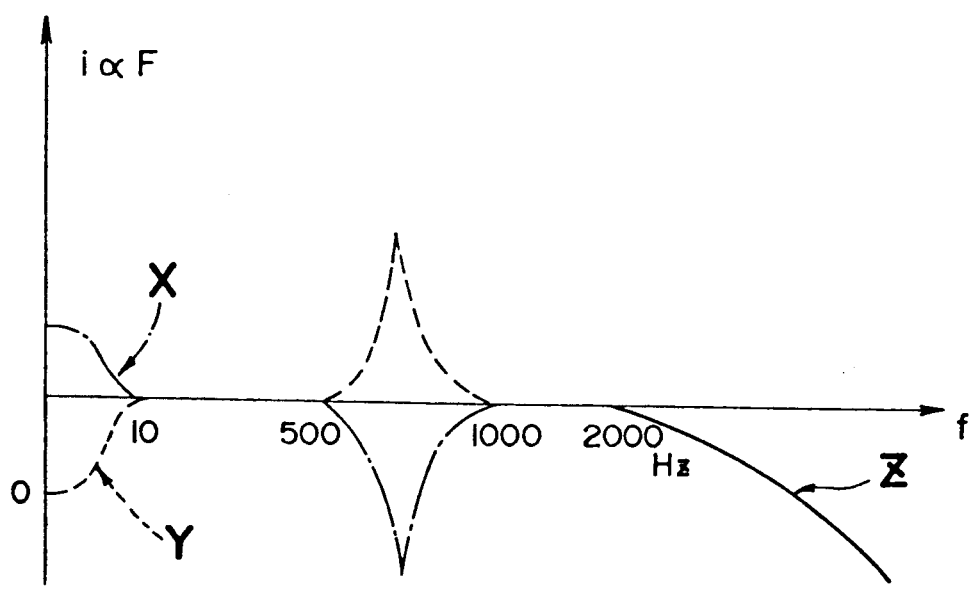
FIG. 4 is a graph showing the relationship between the frequencies of a detected value and an expected value and the current in the conventional robot control apparatus.

The operation of the apparatus of the above construction is described below with reference to FIGS. 1 and 2. At step 9, the command section 1 outputs a current value proportional to a desired force to the subtracter 2. At step 10, the command section 1 outputs an instruction signal for designating the high-pass filter to the programmable filter 7 so that the frequency components lower than a predetermined cutoff frequency are attenuated. Then, frequency components decrease that pass through the programmable filter 7 functioning as the high-pass filter and are inputted into the operator 8, thus reducing the value outputted from the operator 8. Therefore, if the value of the instruction signal outputted from the command section 1 is constant, the value obtained by subtracting the value of the instruction signal from the outputted value of the operator 8 becomes large. The signal for applying a large amount of electric power to the motor 5 is outputted from the subtracter 2 to the electric power amplifier 3. At step 11, a certain period of time elapses until the arm movement can be resumed. At step 12, after the arm starts moving, the command section 1 outputs an instruction signal for designating the band-pass filter to the programmable filter 7 so as to select a band including the characteristic frequencies of the arm of the robot and an object. Then, frequency components outside the pass band are attenuated. Frequency components increase that pass through the programmable filter 7 functioning as the band-pass filter and are inputted into the operator 8, when the arm moves until near the object. Thus, the value outputted from the operator 8 becomes large. Therefore, if the value of the instruction signal outputted from the command section 1 is constant, the value obtained by subtracting the value of the instruction signal from the outputted value of the operator 8 becomes small. The signal for applying a small amount of electric power to the motor 5 is outputted from the subtracter 2 to the electric power amplifier 3. At step 13, a certain period of time elapses until the arm contacts the object. Therefore, at step 14, after the arm contacts the object, the control operation terminates. In the control loop, the subtracter 2 subtracts the current outputted by the command section 1 from the output of the operator 8, thus outputting the result to the electric power amplifier 3. The electric power amplifier 3 applies a voltage to the motor 5. A position counter for counting the output of the encoder 6 may be provided to perform the waiting operation at steps 11 and 13. That is, the operation of steps 12 and 14 starts when the counter has counted up to a set value.

In a second embodiment of the present invention, the current detecting section 4 is omitted from the construction of the first embodiment of the present invention. Then, the second embodiment has less stability in operation than the first embodiment. But the second embodiment has an effect similar to that of the first embodiment.

According to a third embodiment of the present invention, the operator 8 finds the speed of the arm of the robot by performing first-order differentiations unlike the first embodiment. That is, according to the third embodiment, the arm of the robot may move at an approximate equal speed.

A fourth embodiment of the present invention does not include the current detector, and the operator 8 finds the speed of the arm of the robot by performing first-order differentiations. Although the fourth embodiment is less stable in operation than the first embodiment, it has an effect similar to that of the first embodiment.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A robot control apparatus comprising:
   a sine wave signal-outputting means for respectively outputting two sine wave signals of a first phase and a second phase, of a predetermined frequency and having a phase difference of approximately 90°, said sine wave signals being generated by a position shift of a movable portion of a motor used for driving an arm of a robot;
   an operating means for determining a difference value between a first product of a just value corresponding to the sine wave signal having the first phase and a second value obtained by first-order differentiating a signal corresponding to the sine wave signal having the second phase, and a second product of a third value corresponding to the sine wave signal having the second phase and a fourth value obtained by first-order differentiating the signal corresponding tot he sine wave signal having the first phase;

a command means for outputting a current value;

a subtracting means for subtracting the current value outputted form the command means from the difference value outputted from the operating means based on the current value outputted by the command means, and for outputting a signal corresponding to a result of subtraction;

an electric power amplifying means for outputting a signal to the motor in response tothe signal outputted from the subtracting means to supply electric power to the motor for driving the motor; and a programmable filter for operating as one of a high-pass filter and a band-pass filter according to the current value outputted for the command means, the programmable filter being provided between the outputting means and the operating means so that the programmable filter operates as a high-pass filter when the arm of the robot starts moving and the programmable filter operates as a band-pass filter when the arm of the robot stops in contact with an object, and for outputting a signal to the operating means, the signal having been inputted into the programmable filter and passed therethrough.

2. The robot control apparatus as claimed in claim 1, further comprising a current detecting means for detecting a value of current flowing to the motor and for inputting the detected current value into the subtracting means, wherein the subtracting means subtracts the current value outputted from the command means from the difference value outputted from the operating means while considering the detected current value detected by the current detecting means.

3. The robot control apparatus as claimed in claim 1, wherein the operating means performs second-order differentiation in which the first-order differentiated value is further differentiated by a first-order differentiation.

4. The robot control apparatus as claimed in claim 2, wherein the operating means performs second-order differentiation in which the first-order differentiated value is further differentiated by first-order differentiation.

* * * * *